(12) United States Patent
Iio

(10) Patent No.: US 8,600,366 B2
(45) Date of Patent: Dec. 3, 2013

(54) COMMUNICATION APPARATUS, COMMUNICATION SYSTEM, AND COMMUNICATION METHOD

(75) Inventor: Taro Iio, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1090 days.

(21) Appl. No.: 12/091,914

(22) PCT Filed: Oct. 19, 2006

(86) PCT No.: PCT/JP2006/320843
§ 371 (c)(1),
(2), (4) Date: Jul. 16, 2009

(87) PCT Pub. No.: WO2007/049500
PCT Pub. Date: May 3, 2007

(65) Prior Publication Data
US 2009/0298477 A1 Dec. 3, 2009

(30) Foreign Application Priority Data
Oct. 28, 2005 (JP) .................................. 2005-315506

(51) Int. Cl.
*H04M 3/00* (2006.01)
*H04M 3/42* (2006.01)
*H04M 5/00* (2006.01)
*H04B 7/00* (2006.01)
*H04L 12/16* (2006.01)
*H04Q 11/00* (2006.01)
*G06F 15/177* (2006.01)
*G06F 15/16* (2006.01)

(52) U.S. Cl.
USPC ...... 455/418; 455/518; 455/520; 379/202.01; 709/204; 715/735; 370/260

(58) Field of Classification Search
USPC .............. 370/260–261; 709/204; 379/202.01; 455/518–521; 348/14.01; 715/735
See application file for complete search history.

(56) References Cited

U.S. PATENT DOCUMENTS 5,909,543 A * 6/1999 Tanaka et al. ................. 709/204
6,163,692 A * 12/2000 Chakrabarti et al. ......... 455/416

(Continued)

FOREIGN PATENT DOCUMENTS

EP 0715467 A1 6/1996
JP 08-084112 3/1996

(Continued)

OTHER PUBLICATIONS

Japanese language office action dated Feb. 15, 2011 and its English language translation for corresponding Japanese application 2005315506 cites the references above.

(Continued)

*Primary Examiner* — Kent Chang
*Assistant Examiner* — Nathan Brittingham
(74) *Attorney, Agent, or Firm* — DLA Piper LLP (US)

(57) ABSTRACT

Suitable processing is performed considering a case where a confirmation notification of participation in group communication or other data communication was sent, but the notification is delayed and data communication has already ended when the notification arrives at the other party.

The present communication apparatus includes a communication unit 2 for transmitting/receiving data, an input unit 3, and a control unit 7 which, when start of data communication is input from said input unit 3, sends a confirmation notification of participation of the data communication to a plurality of destinations, performs data communication with destinations which reply when receiving at least one reply with respect to the confirmation notification of participation, and performs data communication after adding other destination even after the start of the data communication when receiving a reply from the other destination, wherein when ending the data communication, the control unit 7 makes the communication unit 2 transmit an end notification of the data communication to another party from which a reply for the confirmation notification of participation is not obtained among destinations to which the confirmation notification of participation was transmitted.

2 Claims, 5 Drawing Sheets

(56) References Cited

U.S. PATENT DOCUMENTS

| | | | |
|---|---|---|---|
| 6,873,854 B2 | 3/2005 | Crockett et al. | |
| 7,308,090 B2 * | 12/2007 | White et al. | 379/202.01 |
| 7,925,246 B2 * | 4/2011 | McKibben et al. | 455/416 |
| 2003/0152040 A1 | 8/2003 | Crockett et al. | 370/260 |
| 2003/0153339 A1 | 8/2003 | Crockett et al. | 455/518 |
| 2004/0184586 A1 * | 9/2004 | Coles et al. | 379/88.14 |
| 2005/0069116 A1 * | 3/2005 | Murray, II | 379/202.01 |
| 2005/0202806 A1 * | 9/2005 | Bourgeois et al. | 455/416 |
| 2006/0285670 A1 * | 12/2006 | Chin et al. | 379/201.01 |
| 2007/0254642 A1 * | 11/2007 | Suotula | 455/422.1 |

FOREIGN PATENT DOCUMENTS

| | | |
|---|---|---|
| JP | 2005-018423 | 1/2005 |
| JP | 2005-136524 | 5/2005 |
| WO | 0167674 A2 | 9/2001 |
| WO | 0167675 A2 | 9/2001 |
| WO | 03069928 A1 | 8/2003 |
| WO | WO 03069928 A1 * | 8/2003 |
| WO | 2005096646 A1 | 10/2005 |

OTHER PUBLICATIONS

Anonymous, "Push-To-Talk Over Cellular (PoC) User Plane; Transport Protocols; PoC Release 1.0, V1.1.1", Internet Citation, Oct. 2003, para. 5.1-5.8, para. 7.1-7.2.4.

Extended European search report dated Oct. 16, 2012 issued in corresponding European application 06812021.1 cites the foreign patent documents and Internet citation above.

* cited by examiner

COMMUNICATION APPARATUS, COMMUNICATION SYSTEM, AND COMMUNICATION METHOD

CROSS-REFERENCE TO THE RELATED APPLICATIONS

This application is a national stage of international application No. PCT/JP2006/320843 filed on Oct. 19, 2006, which also claims benefit of priority under 35 U.S.C. §119 to Japanese Patent Application No. 2005-315506 filed on Oct. 28, 2005, the entire contents of which are incorporated by reference.

TECHNICAL FIELD

The present invention relates to a mobile phone or other communication apparatus (communication terminal), a communication system comprised of a plurality of communication terminals, and a communication method suitable for application to the communication apparatus or the communication system.

BACKGROUND ART

In recent years, the modes of communication of phones have become diversified. In addition to conventional voice communication by line switching, phones capable of packet communication utilizing IP (Internet Protocol) networks are being widely utilized. For example, there is "chat mail" for conversations by mobile phones swapping e-mails in real time (see Patent Document 1). Chat mail is one of the modes of communication called "group communication" where pre-registered members form a group and swap text and other data in real time in this group.

In group communication, in general, one terminal in the group becomes a sender and the other terminals become receivers so that one-to-many communication is performed. In a case where a plurality of terminals participates in communication, it would be convenient if the terminal side can grasp what members are participating in communication at present. Accordingly, for example in the system disclosed in Patent Document 2, a management apparatus managing group communication provides a list of participating members to each terminal. This is displayed at a display unit of each terminal.

In such group communication, attempts are being made for voice communication utilizing VoIP (Voice over Internet Protocol). One of these is called "PoC (Push to talk over Cellular)". In PoC, an SIP (Session Initiation Protocol) server manages the groups and the members in the groups and controls packetized voice calls (see Patent Document 3).

A terminal which starts group communication in PoC, for example as disclosed in Patent Document 3, sends a call request (confirmation notification of participation) to members in the group whom he wants to communicate with. When sending the call request, the management apparatus prepares a member list in the group database. The terminals of the members in the group, when receiving the call request, participate in group communication by answering that request.

When ending group communication in PoC, a request for end of communication is transmitted to the management apparatus managing the communication. The management apparatus, when receiving this end request, performs a predetermined procedure for ending the group communication and notifies the end of communication by completion of the procedure to the terminals in the group.

Patent Document 1: Japanese Patent Publication (A) No. 2005-18423
Patent Document 2: Japanese Patent Publication (A) No. 2005-136524
Patent Document 3: Japanese Patent Publication (A) No. 2005-518166

DISCLOSURE OF THE INVENTION

Problem to be Solved by the Invention

However, sometimes a communication terminal of a member to which a call request was transmitted cannot receive that call request due to the signal strength being unstable or another reason.

In such a case, in general, the communication content of the call request (confirmation notification of participation) which was not received and the list of communication terminals are registered once in the management apparatus. When for example signal strength of the communication terminal which could not receive the request becomes good and a reply comes from the communication terminal, the communication content, i.e., call request (confirmation notification of participation) here, is transmitted again from the management apparatus to the communication terminal.

However, when the communication terminal of that member receives the call request by this re-transmission, sometimes a notification of end of group communication corresponding to the call request has been already issued and the end notification arrives at the communication terminal of that member as well at which the call request arrives with a delay.

A first problem to be solved by the present invention is to provide a communication terminal performing suitable processing considering a case where a confirmation notification of participation in group communication or other data communication was transmitted, but the notification is delayed and data communication has already ended when the notification arrives at the other party, and a communication method of the same.

A second problem to be solved by the present invention is to provide a communication system performing suitable processing considering a notification delay at both of the communication terminal transmitted the confirmation notification of participation and the communication terminal receiving this.

Means for Solving the Problems

A communication apparatus according to a first aspect of the present invention includes a communication unit which transmits/receives data, an input unit, and a control unit which, when start of data communication is input from the input unit, sends a confirmation notification of participation of the data communication to a plurality of destinations from the communication unit, performs data communication with destinations which reply when receiving at least one reply with respect to the confirmation notification of participation by the communication unit, and performs data communication after adding other destination even after the start of the data communication when receiving a reply from said other destination, wherein when ending the data communication, the control unit makes the communication unit transmit an end notification of the data communication to another party from which a reply for the confirmation notification of participation is not obtained among destinations to which the confirmation notification of participation was transmitted.

In the present invention, preferably, the apparatus further includes a storage unit storing a state of participation in the data communication, and the control unit stores a participation state of data communication in the storage unit for each destination after sending the confirmation notification of participation.

Further preferably, when the communication unit receives a reply of participation or nonparticipation in the data communication, the control unit updates the participation state stored in the storage unit in accordance with the received reply content.

In the present invention, preferably the control unit is connected to a predetermined management apparatus by the communication unit when starting the data communication, and the confirmation notification of participation of the data communication includes a parameter for connection to the management apparatus used in the data communication.

A communication apparatus according to a second aspect of the present invention including a communication unit transmitting/receiving data and a control unit performing start processing of data communication when the communication unit receives a confirmation notification of participation of data communication, wherein the control unit does not perform the processing for the start of data communication in a case where an end notification of the data communication has been already received when the communication unit receives the confirmation notification of participation of the data communication.

In the present invention, preferably, the confirmation notification of participation of the data communication includes a parameter for the connection to a predetermined management apparatus, and the control unit is connected to the management apparatus by using the parameter included in the confirmation notification of participation when receiving the confirmation notification of participation and starting data communication.

In the present invention, preferably, when receiving the confirmation notification of participation, the control unit judges that the confirmation notification of participation and the end notification are based on the same data communication by a fact that at least a portion for identifying data communication among parameters included in the confirmation notification of participation is included in the end notification which has been already received.

A communication system according to a third aspect of the present invention is a communication system configured by and including a first communication terminal and a second communication terminal performing data communication with respect to each other, wherein the first communication terminal has a first communication unit for performing data communication and a first control unit for transmitting a confirmation notification of participation of data communication from the first communication unit to a plurality of destinations and, when there is no reply from a destination of the confirmation notification of participation by the end of the data communication, transmitting an end notification of the data communication from the first communication unit to the destination from which no reply has come, the second communication terminal has a second communication unit transmitting/receiving data and a second control unit for performing, when the second communication unit receives a confirmation notification of participation of data communication, start processing of the data communication and, at the same time, replying regarding participation in the data communication at the second communication unit, and the second control unit does not perform the processing for the start of the data communication when an end notification of the data communication has been already received when the second communication unit receives a confirmation notification of participation of the data communication.

A communication method according to a fourth aspect of the present invention includes a step of sending a confirmation notification of participation of data communication, a step of changing a participation state of data communication on a basis of a reply when there is a reply to the confirmation notification of participation, a step of performing the data communication, and a step of transmitting an end notification of the data communication to the destination of the confirmation notification of participation which did not reply when a reply does not arrive by the end of the data communication.

In the present invention, preferably the method further includes a step of judging if an end notification of the data communication has been already received when the confirmation notification of participation is received at the destination of the confirmation notification of participation and a step of performing processing for the start of the data communication when the end notification of the data communication is not received.

Effect of the Invention

According to the present invention, there are the advantages that suitable processing is executed considering the case where a confirmation notification of participation in group communication or other data communication was transmitted, but the notification was delayed and the data communication already ended when the notification arrived at the other party and that a reduction of power consumption of communication terminals and a reduction of waste become possible.

Figure 1:
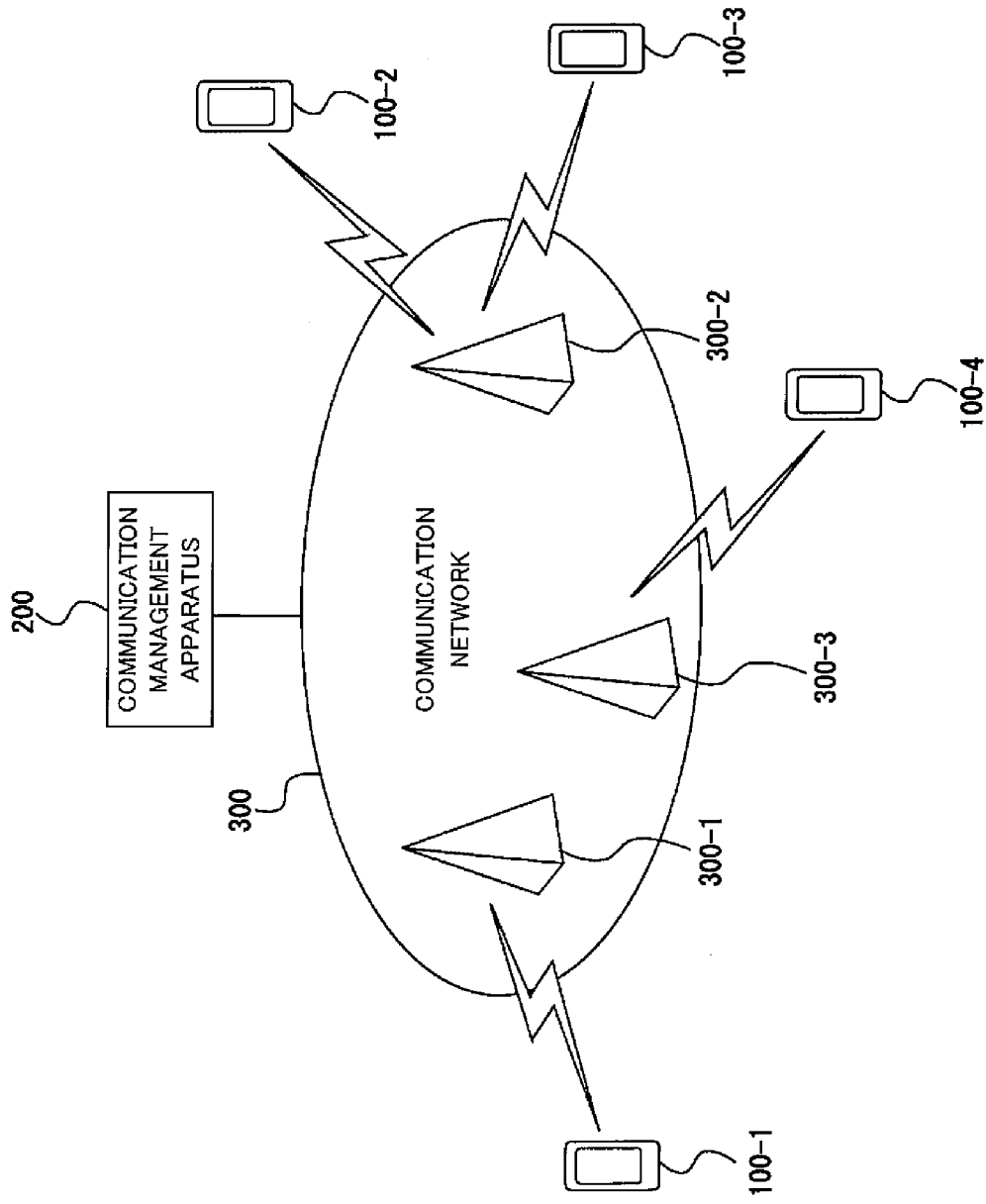
[FIG. 1] A diagram showing an example of the configuration of a communication system according to an embodiment of the present invention.

DESCRIPTION OF NOTATIONS 1 antenna
2 communication unit
3 key input unit
4 audio processing unit
5 display unit
6 storage unit
7 control unit
71 transmission control unit
72 reception control unit
73 storage control unit
100-1 to 100-4 communication terminals
200 communication management apparatus
300 communication network
300-1 to 300-3 base stations

BEST MODE FOR CARRYING OUT THE INVENTION

FIG. 1 is a diagram showing an example of the configuration of a communication system according to an embodiment of the present invention.

The communication system according to the present embodiment, for example as shown in FIG. 1, has a plurality of communication terminals (100-1, 100-2, 100-3, 100-4, . . . ) and a communication management apparatus 200.

A communication terminal 100-i (i indicates a natural number) is for example a mobile phone or other wireless communication terminal and is connected to a communication network 300 via a base station (300-1, 300-2, 300-3, . . . ) Further, the communication terminal 100-i performs data communication under the control of a communication management apparatus 200 connected to the communication network 300. In the present embodiment, it is assumed that group communication according to PoC (Push to talk over Cellular) is carried out as an example.

The communication management apparatus 200 is an apparatus managing group communication of PoC by a plurality of communication terminals (100-1, 100-2, 100-3, 100-4, . . . )

Data transmitted in the data communication includes for example audio of speech, images, text, and other data.

Figure 2:
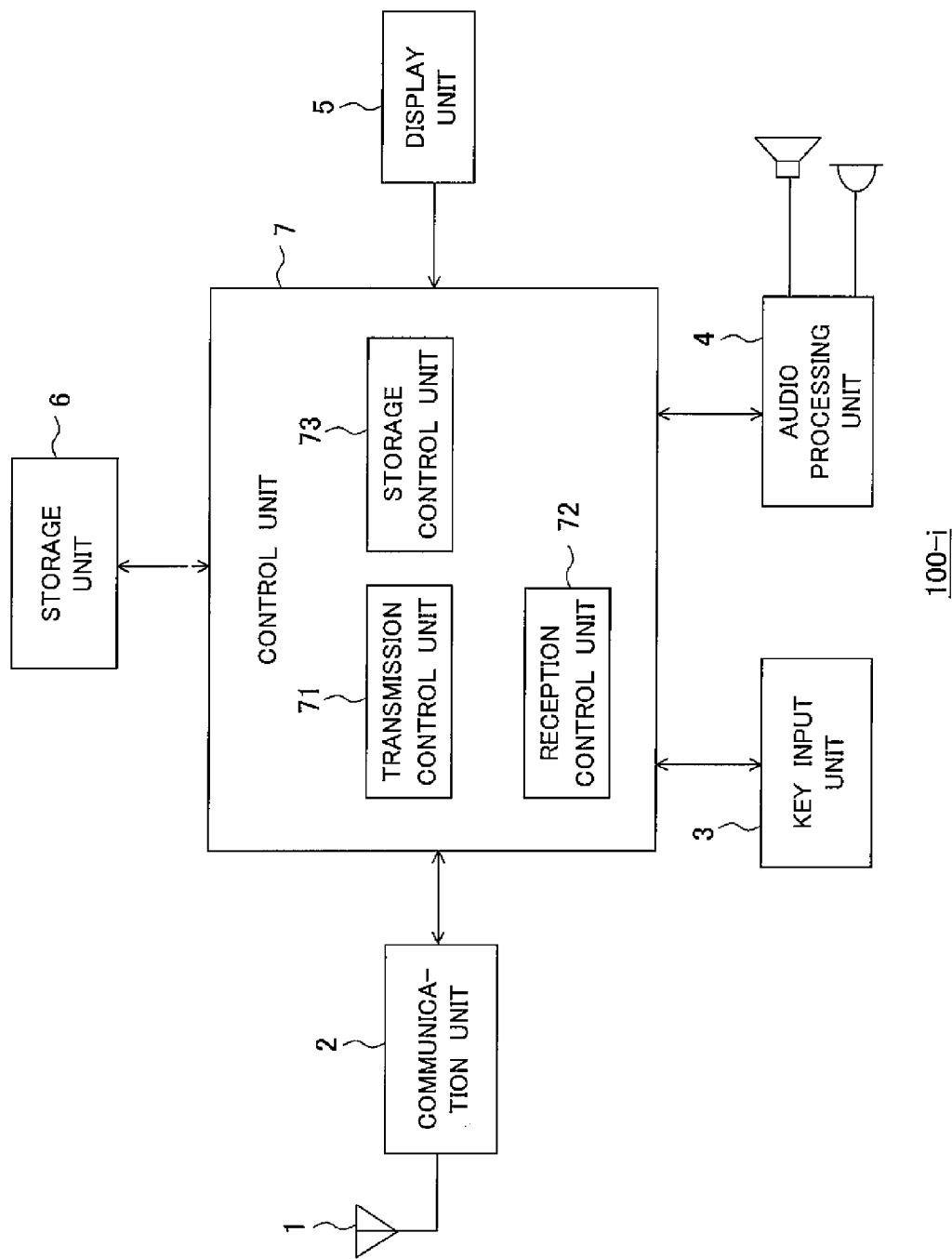
[FIG. 2] A diagram showing an example of the configuration of a communication terminal according to the embodiment of the present invention.

FIG. 2 is a diagram showing an example of the configuration of the communication terminals (100-1, 100-2, 100-3, 100-4, . . . ) according to the embodiment of the present invention.

Each communication terminal, for example as shown in FIG. 2, has an antenna 1, communication unit 2, key input unit 3, audio processing unit 4, display unit 5, storage unit 6, and control unit 7.

The communication unit 2 performs processing concerning wireless communication with the base stations (300-1, 300-2, 300-3) of the communication network 300. For example, it applies predetermined modulation processing to transmission data supplied from the control unit 7 to converts it to a wireless signal and transmits the same from the antenna 1. Further, it applies predetermined demodulation processing to the wireless signal from the base station received at the antenna 1 to convert it to reception data and outputs the same to the control unit 7.

The communication terminal 100-i performs communication via this communication unit 2 with the communication management apparatus 200 or other communication terminal connected to the communication network 300.

The key input unit 3 is a device for inputting an instruction of a user to a communication terminal 100-i. For example, it has a talk key, number keys, letter keys, direction keys, an execute key, and other keys having various functions. When these keys are operated by the user, the operation content thereof is transformed to electric signals and output to the control unit 7.

The audio processing unit 4 processes audio signals input/output at a speaker or microphone. Namely, it applies amplification, analog-to-digital conversion, encoding, and other signal processing to an audio signal input from the microphone to convert it to digital audio data, and outputs the same to the control unit 7. Further, it applies decoding, digital-to-analog conversion, amplification, and other signal processing to the audio data supplied from the control unit 7 to convert it to an analog audio signal, and outputs the same to the speaker.

The display unit 5 is configured by a display device such as a liquid crystal display panel or organic EL panel and displays an image in accordance with the image data supplied from the control unit 7. For example, it displays a phone number of the call destination at the time of an outgoing call, a phone number of the other party at the time of an incoming call, content of received mail and transmitted mail, a waiting screen, the date, time, remaining battery life, and so on.

Further, the display unit 5 displays various types of information sent from the communication management apparatus 200 when group communication according to PoC is carried out.

The storage unit 6 stores the various types of data utilized in the processing of the control unit 7 and data of processing results of the control unit 7. For example, it stores a computer program of the control unit 7, constant data used in that processing, variable data which must be temporarily held in the processing step, and so on.

Note that while details will be explained later, each communication terminal 100-i can read out the participation state of group communication from a management table of group communication held by the communication management apparatus 200 under the control of the control unit 7.

In that case, the storage unit 6 can hold the participation state read out by the control unit 7.

The control unit 7 performs various processing concerning the overall operation of the communication terminals.

For example, as the processing concerning group communication, this controls the input/output of audio at the audio processing unit 4, input of text data from the key input unit 3, display of information in the display unit 5, and transmission/reception of data in the communication unit 2 so that audio speech and data communication are suitably carried out according to predetermined protocol in PoC.

The control unit 7 has for example a computer for executing processing based on a program (operating system, application, or the like) stored in the storage unit 6 and executes the processing explained above according to the program.

The control unit 7 has, as processing blocks concerned with group communication of PoC, a transmission control unit 71, reception control unit 72, and storage control unit 73. Note that the control unit 7 has a function of control of the display unit 5 and audio processing unit 4, a function of supervising the signal reception state, a timer function, and a function of decoding the operation of the key input unit 3 as well. However, illustration of these is omitted.

The transmission control unit 71 performs processing for transmitting data from the communication unit 2 at the time of group communication of PoC. For example, when a predetermined key operation of the key input unit 3 is carried out at the time of performing group communication of PoC, a start request of group communication, talk request, or end request is transmitted from the communication unit 2 to the communication management apparatus 200. When these requests are permitted, notifications in accordance with those requests are transmitted to the other communication terminals.

The reception control unit 72 performs processing for receiving the data at the communication unit 2 at group communication of PoC. For example, it receives the talk content from the other communication terminal participating in group communication and further receives the participation state of the other communication terminal and other various types of information provided by the communication management apparatus 200. This information includes a request, notification, etc. from the communication management apparatus 200 as well.

The storage control unit 73 controls the processing for writing information, software, etc. to be stored in the storage unit 6, reading out information in the storage unit 6, or updating the written information.

Next, an explanation will be given of the operation of the communication system according to the present embodiment having the configuration explained above by using FIG. 3 to FIG. 5. Note that, in this explanation, FIG. 1 and FIG. 2 will be appropriately referred to as well.

Figure 3:
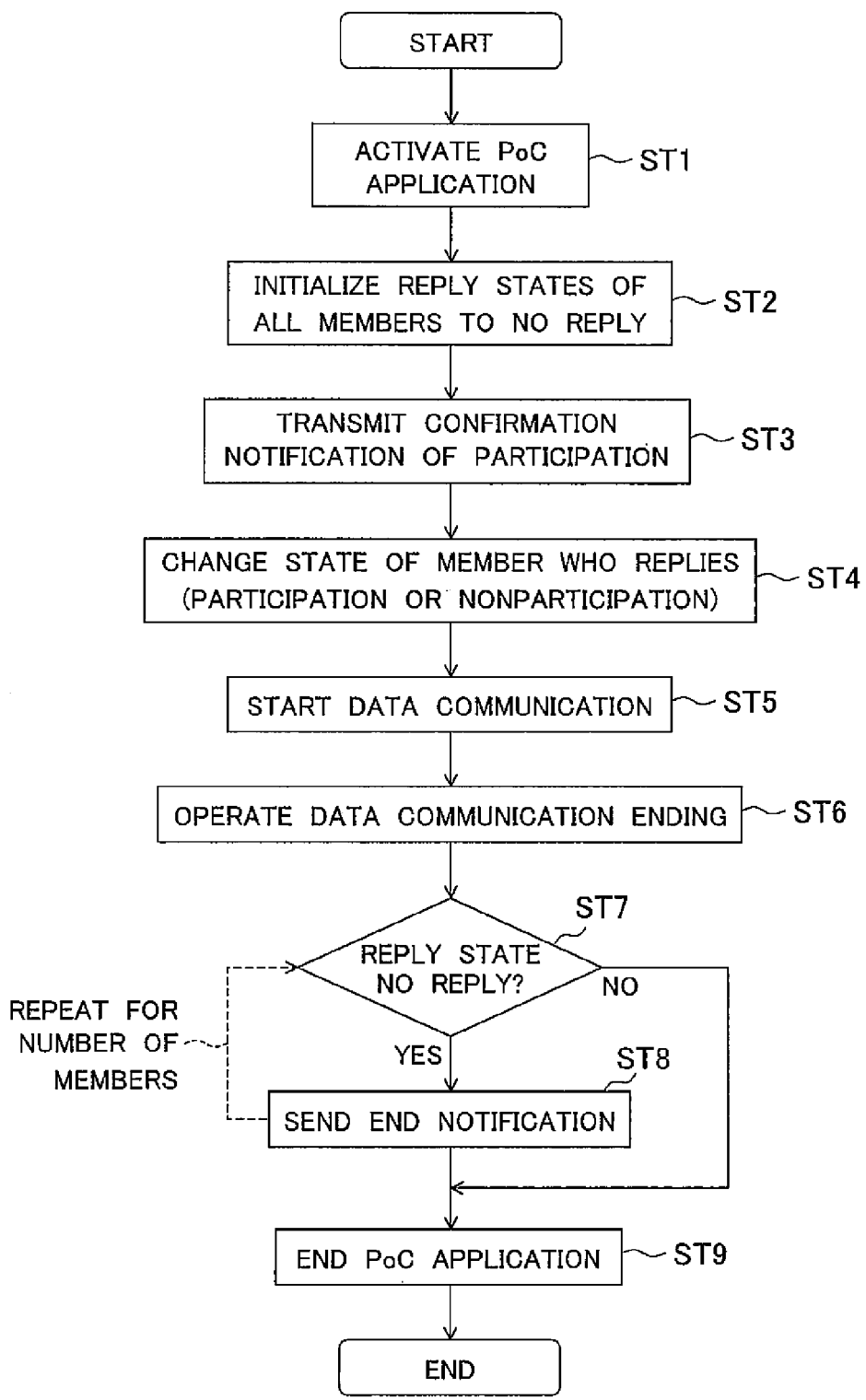
[FIG. 3] A processing flow chart of a communication starting terminal.
Figure 4:
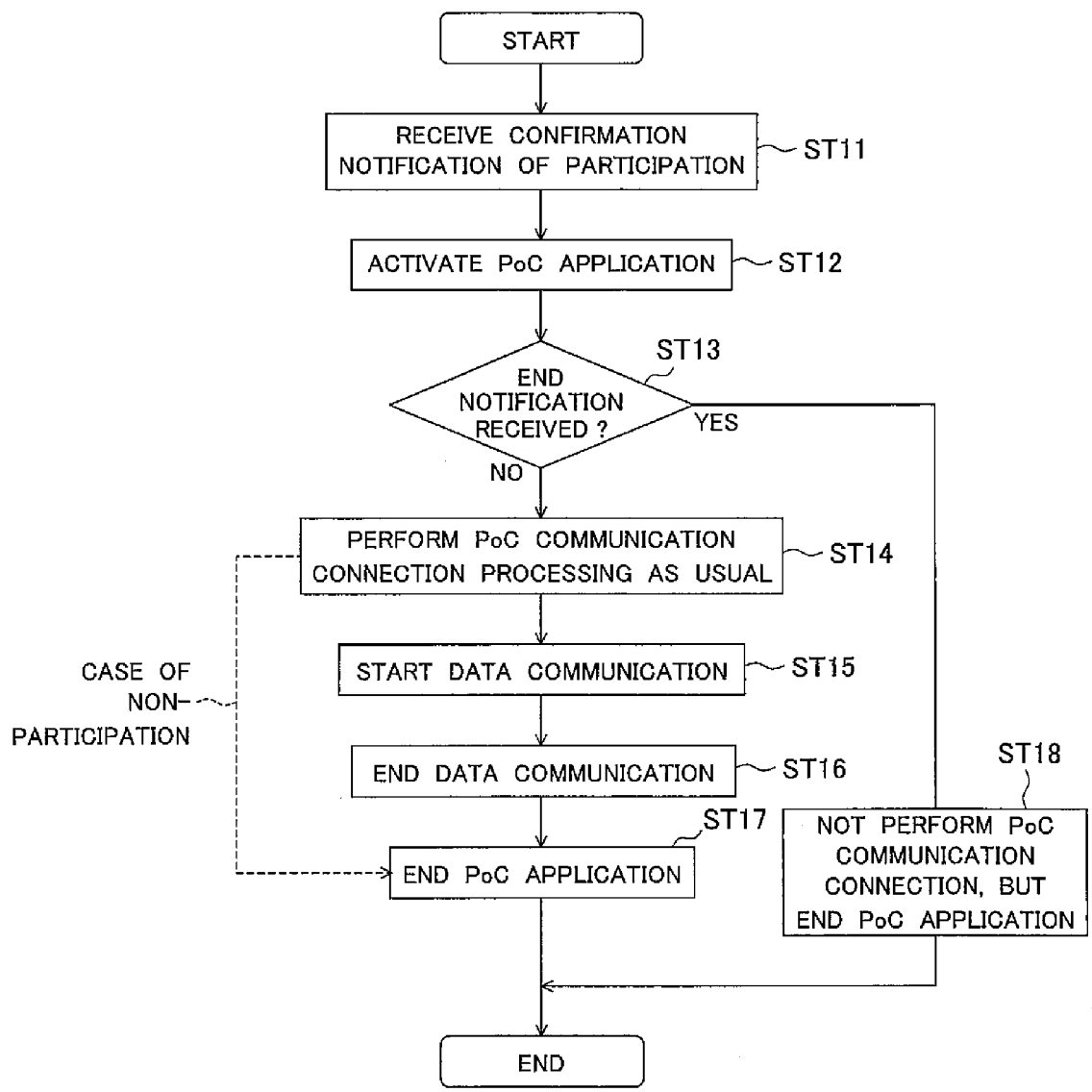
[FIG. 4] A processing flow chart of another communication terminal corresponding to a member of group communication.
Figure 5:
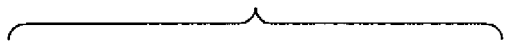
[FIG. 5] An explanatory diagram showing an example of a participation state.

FIG. 3 is a flow chart of processing of the one terminal calling up group communication according to PoC (hereinafter referred to as the "communication starting terminal") among the plurality of communication terminals (100-1, 100-2, 100-3, 100-4, . . . ) shown in FIG. 1. FIG. 4 is a flow chart of processing of a communication terminal called to participate in the group communication. Further, FIG. 5 is an explanatory diagram showing an example of the participation state stored in the storage unit 6 (see FIG. 2) of the communication starting terminal.

First, an explanation will be given of the processing of the communication starting terminal by using FIG. 3.

When the communication terminal 100-1 is determined as the communication starting terminal, as shown in FIG. 3, the processing for group communication is started by the user of the communication starting terminal 100-1 operating the key input unit 3 to activate the PoC application software (hereinafter abbreviated as the "PoC application") (step ST1).

At step ST1, the user designates the phone numbers of the communication terminals 100-2, 100-3, and 100-4 or other identification information of the other parties (communication participating member) whom he wants to communicate with through the PoC application. Next, according to the processing routine of the PoC application, the control unit 7 of the communication starting terminal 100-1 controls the communication unit 2 so as to call up and connect with the communication management apparatus 200 serving as the server on the Internet or other communication network 300 via the base station 300-1. First, it starts communication including the transmission of the start request of group communication after informing its own phone number or other identification information.

When receiving the start request of group communication according to PoC from the communication starting terminal 100-1 and the communication with the communication starting terminal 100-1 is started, the communication management apparatus 200 requests from the communication starting terminal 100-1 the identification information of the communication participating members as well, makes the terminal send it, and receives it. From this identification information concerning members and the identification information of the communication starting terminal 100-1, the communication management apparatus 200 prepares a management table concerning group communication as the participation state list and, at the same time, provides the communication management apparatus 200 (or other server as well) with a site for controlling group communication such as mutual data transmission/reception of each of the communication terminals and imparting of a right to speak.

Although it is not particularly provided as a step in FIG. 3, next, the communication starting terminal 100-1 requests the communication management apparatus 200 to transmit the participation state list. The communication management apparatus 200 sends the required information (information of participation state) from the management table to the communication starting terminal 100-1 in response to that request. The sent information of the participation state is sent from the communication unit 2 to the control unit 7 in the communication starting terminal 100-1 and written into the storage unit 6 under the control of the storage control unit 73 thereof.

Next, the communication starting terminal 100-1 initializes the reply states of all members scheduled for the group communication to be held to "no reply" (step ST2).

In the participation state list shown in FIG. 5, in the present example, flag information indicating "reply" or "no reply" is described in "reply state" corresponding to the identification information of holders of communication terminals (registered persons A to F) and their phone numbers. The storage control unit 73 in the control unit 7 sets the reply states of these members to "no reply".

When the management table is stored in the storage unit 6 of the communication starting terminal 100-1 as well, the communication management apparatus 200 transmits the confirmation notification of participation to all members of group communication (step ST3).

Here, the "confirmation notification of participation" is a notification that a site for controlling group communication is provided and includes the log-in ID of the above site provided by the communication management apparatus 200, address of this site on the Internet, identification information (phone number, name, e-mail address, etc.) of the promoter of the group communication (communication starting terminal 100-1), sending time of the confirmation notification of participation (time when group communication is started) and other parameters. The confirmation notification of participation is transmitted from the site for controlling group communication to the communication terminals 100-2, 100-3, and 100-4 of the members based on the identification information etc. of the members described in the above management table. When participating in group communication, the communication terminals 100-2, 100-3, and 100-4 of the members become able to be connected to the communication management apparatus 200 and the above site by using parameters included in this confirmation notification of participation.

After that, the communication management apparatus 200 monitors for replies from the members to which it sent the confirmation notification of participation. When there is a reply from any of these members, the communication management apparatus 200 notifies this to the communication starting terminal 100-1 at each reply and, at the same time, sets participation (IN) or nonparticipation (OUT) in the participation situation of the management table which the communication management apparatus 200 itself has. The communication starting terminal 100-1 sets the participation situation of the participation state in the storage unit 6 to "participation" (IN) or "nonparticipation" (OUT) according to the reply content (according to presence/absence of participation flag or the like) of the other member received from the communication management apparatus 200 (step ST4).

Note that this confirmation notification of participation may be transmitted from the communication management apparatus 200 to the communication terminals 100-2, 100-3, and 100-4 of the other members or may be transmitted from the communication starting terminal 100-1 directed to the address of each member. Further, the replies from the members and the talk etc. of group communication are managed through the communication management apparatus 200 and delivered to the communication starting terminal 100-1.

When an owner of one communication terminal (for example 100-3) depresses the talk key, talk is requested from this communication terminal 100-3 to the communication management apparatus 200. When there is another member who is depressing the talk key, the communication management apparatus 200 transmits a reject signal to the communication terminal 100-3, and then the communication terminal 100-3 emits an error sound and notifies the inability of talk. Further, when there is no other member who is depressing the talk key, the communication management apparatus 200 permits the talk of the communication terminal 100-3, receives data (speech content) from the communication terminal 100-3, and transmits this received data to all of the other participating members. By repeating such control of talk, group communication is carried out (step ST5).

Note that, replies of participation or nonparticipation from members to the confirmation notification of participation of group communication explained above can be appropriately accepted even during group communication as explained at step ST5. When any is received, the communication starting terminal 100-1 updates the participation situation of the management table at each reception.

When the end of group communication is proposed from the communication starting terminal 100-1 or another member and the owner of the communication starting terminal 100-1 performs an end operation by a predetermined key of the key input unit 3 (step ST6), the communication unit 2 is controlled so as to call up and connect to the communication management apparatus 200 and communication including the transmission of the end request of the group communication is started after informing the phone number etc. and other identification information.

Further, the communication starting terminal 100-1 starts the processing for ending group communication (steps ST7 to ST9).

At step ST7, the control unit 7 (storage control unit 73) of the communication starting terminal 100-1 confirms the reply state in the participation state list in the storage unit 6. When this judgment finds that there is a member having a "no reply" reply state (judgment at step ST7 is "Yes"), the communication starting terminal 100-1 transmits the end notification for announcing that group communication ends to the member who does not reply (step ST8).

Here, the end notification is a notification closing the site for controlling group communication and includes parameters the same as those of the confirmation notification of participation, that is, the log-in ID of the site provided by the communication management apparatus 200, address of the site on the Internet, identification information (phone number, name, e-mail address, etc.) of the promoter (communication starting terminal 100-1) of the group communication, sending time of confirmation notification of participation (time when group communication is started), sending time of the end notification, and other parameters. After sending the end notification to the required members, access to the site becomes impossible except a case where a procedure of restart is separately taken.

Note that, concerning this end notification, the talk request of that notification may be sent to the communication management apparatus 200 together with the identification information of any member who does not reply, while the end notification may be sent from the site for controlling group communication to any member who does not reply. Alternatively, the end notification may be transmitted from the communication starting terminal 100-1 directed to the address of the member who does not reply.

These steps ST7 and ST8 are executed for all members having "no reply" reply states. Note that it is also possible if the communication starting terminal 100-1 confirms the reply states to identify all members with "no reply" and transmits an end notification command directed to those members to the communication management apparatus 200 and the communication management apparatus 200 receiving this end notification command transmits end notifications to communication terminals of all corresponding members all together.

Further, the end notifications may be sent to members who participate in group communication and have already understood the communication end as well. However, there is nothing stopping not sending the end notifications. That case is preferred since there is no waste in the processing of the end notifications.

As the case where the judgment at step ST7 is "NO", there are a case where the replying states of all members become "reply" in the first judgment and a case where the sending of end notifications to all members of "no reply" in their reply states-ends in a process repeating steps ST7 and ST8.

When the control unit 7 of the communication starting terminal 100-1 ends the PoC application at step ST9 in the case corresponding to any of these cases, the related processing is completed.

Next, an explanation will be given of the processing in a communication terminal, other than the communication starting terminal, for which the group communication is permitted.

When the confirmation notification of participation is sent from the communication management apparatus 200 (or communication starting terminal 100-1) at step ST3 of FIG. 3 as explained above and the communication terminal (for example 100-3) receives this (step ST11 in FIG. 4), the fact that participation in group communication was invited (confirmation notification of participation) is informed to the user of the communication terminal 100-3 by any means, for example, an icon of the waiting screen.

After that, when the user of the communication terminal 100-3 performs a predetermined key operation of the key input unit 3 to activate the PoC application (step ST12), the content of this confirmation notification of participation is displayed on the screen of the display unit 5.

Note that the display of the confirmation notification of participation need not be linked with the activation of the PoC application. In this case, it is necessary to give a display opportunity by manual operation, for example, have the user operate the key input unit 3 and select the notification display item of the PoC application screen. Further, it is possible to set a fully automated routine, that is, automatically activate the PoC application when there is a confirmation notification of participation and automatically display the screen of the confirmation notification of participation on the display unit 5.

On the display screen of the confirmation notification of participation, for example the identification information of the sender and check columns of participation/nonparticipation in group communication are provided.

Next, the control unit 7 of the communication terminal 100-3 searches for a communication history or communication folder etc. from among the held contents in the storage unit 6 or communication control unit 71 itself and checks if the end notification has been already received (step ST13). When the end notification has been already received and stored in the storage unit 6, it is searched if some of the parameters included in the confirmation notification of participation received this time overlap with parameters of the end notification stored in the storage unit 6. For example, when an end notification is found where the unit of parameters (for example promoter identification information and start time) described in the confirmation notification of participation overlaps, it can be judged that this confirmation notification of participation and end notification are based on the same group communication. In this case, it can be judged that the group communication already ended, and the timing of receiving the confirmation notification of participation was simply around the end notification due to some sort of circumstance. Accordingly, wasted communication no longer occurs since group communication is not started.

The reception confirmation of the end notification of this step ST13 may be carried out by the control unit 7 only one time or repeatedly confirmed periodically within a predetermined time by utilizing the timer function.

When the end notification is not received (judgment at step ST13 is "NO"), as usual, the connection processing of PoC communication is carried out (step ST14).

Here, the connection processing of PoC communication includes processing sending a reply of participation or non-participation in group communication via the communication management apparatus 200 to the communication starting terminal 100-1.

Specifically, when the PoC application is activated, as explained above, the screen of the confirmation notification of participation is displayed on the display unit 5. The user viewing this screen operates the key input unit 3 to click that it will participate or won't participate and performs the key operation for replying. Then, this is sent as the reply of the confirmation notification of participation to the communication management apparatus 200.

As explained above, the communication management apparatus 200 monitors for replies from members, updates the participation states of the management table of the members who replied in accordance with the reply content, and, at the same time, sends the reply content to the communication starting terminal 100-1. By that, the change of the participation state is reflected on the participation state stored in the storage unit 6 in the communication starting terminal 100-1.

When the communication terminal 100-3 replies it will not participate, the control unit 7 ends the PoC application at step ST17. The processing is completed by this.

On the other hand, when it replies it will participate, the talk request explained above from the communication terminal 100-3 of the member performing the processing shown in FIG. 4 is possible, and the reception of talk from the other communication terminals in the communication group including the communication starting terminal 100-1 by the communication terminal 100-3 becomes possible (establishment of communication session).

When a talk request is issued from one communication terminal in this state, data communication (group communication) is started (step ST15).

When the end of group communication by data communication is proposed from any communication terminal, the group communication ends (step ST16). Therefore, the control unit 7 ends the PoC application at step ST17. The processing is completed by this.

On the other hand, when the confirmation notification of participation is received at step ST11 of FIG. 4 and the PoC application is activated, the end notification has sometimes already been received. For example, when the confirmation notification of participation is sent from the communication starting terminal 100-1 first, sometimes the reception state of the communication terminal 100-3 is poor and the reception of the confirmation notification of participation is delayed due to that. At this time, it is assumed that time has already passed and group communication has ended. In that case, as explained above, the communication terminal 100-3 is recognized "no reply" in the processing for group communication ending of FIG. 3. Therefore, a case may occur where the end notification is sent from the communication starting terminal 100-1 to the communication terminal 100-3, and for example the end of communication is stored in a reception folder.

In such a case, at step ST13 of FIG. 4, when the reception of an end notification is detected by the control unit 7, the processing flow proceeds to step ST18. Here, the control unit 7 does not perform the PoC communication connection, but ends the PoC application.

In the present embodiment, there are the following features and advantages in the processing on the communication starting terminal side shown in FIG. 3.

First, when the confirmation notification of participation of data communication is sent to a plurality of destinations (step ST3), but there is no reply from a destination of the confirmation notification of participation by the end of processing data communication (for example step ST6 of FIG. 3), the end notification of data communication is transmitted to the destination which does not reply (step ST8).

Accordingly, it is not necessary to send the end notification to members who have already participated in communication and understood the end of data communication (group communication), there is no wasted processing by that amount, the efficiency of processing is high, and wasted power consumption does not occur either.

The participation state of the data communication is stored in the storage unit 6 in the communication starting terminal 100-1. For this reason, the communication starting terminal 100-1 does not require the procedure of inquiry about the participation state to the communication management apparatus 200 when sending the end notification to a member who does not reply, the processing efficiency is high, and wasted power consumption does not occur.

This participation state in the storage unit 6 is rewritten for each reply in accordance with the reply content whenever a reply comes from the other party of transmission of the confirmation notification of participation, therefore always becomes the newest information.

Further, in the present embodiment, there are the following features and advantages in the processing shown in FIG. 4 in the communication terminal 100-3 to which participation in group communication is called.

In FIG. 4, there is provided a confirmation step of end notification (ST13) and a step of omitting PoC connection and ending the PoC application where the reception of the end notification is recognized in that confirmation step (ST18).

Usually, the end notification cannot be confirmed unless the PoC application software is activated. Accordingly, the communication terminal 100-3 which receives the confirmation notification of participation (call request) with a delay will once activate the PoC application software (ST12). In that case, if the two steps ST13 and ST18 explained above are not provided, the PoC communication connection processing (step ST14) will be further executed, but the group communication for which participation was called for sometimes will have already ended at this time.

In this case, the PoC connection processing (ST14) is wasted processing meaningless to the communication terminal 100-3, so useless power is consumed. Further, the call for impossible participation in group communication is meaningless to the communication terminal 100-3, and is just troublesome.

In the present embodiment, it is confirmed if the end notification is received (ST13). When it is received, the PoC communication connection is not carried out, but the processing for ending the PoC application (ST18) is carried out. Therefore, wasted processing having no meaning, for example the PoC communication connection to a group in which the user cannot participate explained above, is not carried out, and power is saved by that worth. Further, communication connection not meant for the user is reduced, and trouble can be reduced.

The confirmation of this end notification is carried out by comparison of parameters included in the confirmation notification of participation and parameters included in the end notification and stored in the storage unit 6. Therefore, for example when the promoter identification information and start time overlap, identification of end notification and confirmation notification of participation on a basis of same group communication is possible.

Further, when data communication is managed on the storage unit 6 as well so as to leave behind a history, it can be configured so that a plurality of types of parameters which overlap among parameters are retrieved. In this configuration, even when a large number of group communications occur at close timings, group communications causing the error that reception of end notifications and confirmation notifications of participation occur out of sequence can be correctly discriminated.

The invention claimed is:

1. A communication system configured by and including a first communication terminal and a second communication terminal performing data communication with respect to each other via a predetermined management apparatus, wherein
the first communication terminal has
a first communication unit for performing data communication and
a first control unit which, when said data communication is requested, connects to said management apparatus and requests to send to a plurality of communication terminals including said second communication terminal a confirmation notification of participation of the data communication including a parameter for connection to the management apparatus via said first communication unit, performs data communication with at least one communication terminal which replies with respect to the confirmation notification of participation via said management apparatus, and transmits an end notification of the data communication from said first communication unit to a communication terminal which has not been participated in said data communication among communication terminals to which the confirmation notification of participation was transmitted when ending the data communication,
the second communication terminal has
a second communication unit transmitting/receiving data and
a second control unit for connecting, when the second communication unit receives a confirmation notification of participation of data communication, to said management apparatus using a parameter included in the received confirmation notification of participation, activating an operation of an application program of the data communication, and performing start processing of the data communication among communication terminals including said first communication terminal via said management apparatus and, at the same time, replying regarding participation in the data communication via the second communication unit, and the second control unit does not perform the start processing for participation of the data communication based on the received confirmation notification of participation when an end notification of the data communication has been already received when the second communication unit receives the confirmation notification of participation of the data communication, and ends the operation of the application program of the data communication.

2. A communication method including:
a step of requesting a predetermined management apparatus, when a plurality of communication terminals are designated and start of data communication is requested by a communication starting terminal, to send the plurality of communication terminals a confirmation notification of participation of the data communication including a parameter for connection to the management apparatus;
a step of activating an operation of an application program of the data communication;
a step of performing data communication via said management apparatus with at least one communication terminal which replies with respect to the confirmation notification of participation;
a step of controlling a state of participation in the data communication performed by the communication starting terminal based on a reply with respect to the confirmation notification of participation;
a step of adding other communication terminal even after the start of the data communication when receiving a reply with respect to the confirmation notification of participation from said other communication terminal;
a step of transmitting an end notification of the data communication from the communication starting terminal to a communication terminal which did not start to participate in the data communication and did not reply among communication terminals to which the confirmation notification of participation was transmitted when ending the data communication;
a step of judging if an end notification of the data communication including a parameter matching to said parameter for connection to the management apparatus included in said received confirmation notification of participation has been already received when the confirmation notification of participation is received at the destination of the confirmation notification of participation;
a step of connecting to said management apparatus using said parameter for connection to the management apparatus included in said received confirmation notification of participation and performing start processing for participation of the data communication when the end notification of the data communication is not received;
a step of controlling not to perform the start processing for participation of the data communication including the connection to said management apparatus using said parameter for connection to the management apparatus included in said received confirmation notification of participation when the end notification of the data communication has been received; and
a step of ending the operation of the application program of the data communication.

* * * * *